(12) United States Patent
Seo et al.

(10) Patent No.: US 11,409,492 B2
(45) Date of Patent: Aug. 9, 2022

(54) SYSTEM INCLUDING A PLURALITY OF DISPLAY APPARATUS AND CONTROL METHOD THEREOF

(71) Applicant: SAMSUNG ELECTRONICS CO., LTD., Suwon-si (KR)

(72) Inventors: Hoseong Seo, Suwon-si (KR); Hyeongjin Lee, Suwon-si (KR); Changwon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/256,893

(22) PCT Filed: Jul. 12, 2019

(86) PCT No.: PCT/KR2019/008660
§ 371 (c)(1),
(2) Date: Dec. 29, 2020

(87) PCT Pub. No.: WO2020/017834
PCT Pub. Date: Jan. 23, 2020

(65) Prior Publication Data
US 2021/0286578 A1    Sep. 16, 2021

(30) Foreign Application Priority Data

Jul. 19, 2018 (KR) .................... 10-2018-0084328

(51) Int. Cl.
*G09G 3/3208* (2016.01)
*G06F 3/14* (2006.01)

(52) U.S. Cl.
CPC ................. *G06F 3/1446* (2013.01)

(58) Field of Classification Search
CPC ................. G09G 2300/026
See application file for complete search history.

(56) References Cited

U.S. PATENT DOCUMENTS

| 2013/0057592 | A1* | 3/2013 | Tseng | G09G 5/026 |
| | | | | 345/690 |
| 2015/0286456 | A1 | 10/2015 | Griffin et al. | |
| 2017/0329568 | A1 | 11/2017 | Jo | |
| 2019/0206309 | A1* | 7/2019 | Sun | H01L 27/3267 |

FOREIGN PATENT DOCUMENTS

| KR | 10-1548351 B1 | 8/2015 |
| KR | 10-2017-0028810 A | 3/2017 |
| KR | 10-2017-0055636 A | 5/2017 |
| KR | 10-1739530 B1 | 5/2017 |

OTHER PUBLICATIONS

International Search Report dated Nov. 13, 2019 issued by the International Searching Authority in International Application No. PCT/KR2019/008660 (PCT/ISA/210).

* cited by examiner

*Primary Examiner* — Carl Adams
(74) *Attorney, Agent, or Firm* — Sughrue Mion, PLLC

(57) ABSTRACT

A display apparatus in a display system displays an image based on a received image signal, obtains and stores status information showing operation status of the plurality of display apparatuses, and identifies whether the plurality of display apparatuses normally operate based on the stored status information, and outputs result information about the identified normal/abnormal operation.

11 Claims, 9 Drawing Sheets

FIG. 5

| SET 3 | Node 3A | Node 3B | Node 3C |
| SET 2 | Node 2A | Node 2B | Node 2C |

SET 1

Node 1A

| No. | ITEMS |
|---|---|
| 1 | Video Error Count |
| 2 | Unstable Count Measure |
| 3 | Lock Status |
| 4 | HDCP Status |
| 5 | EDID Status |
| 6 | HPD Status |

Node 1B

| No. | ITEMS |
|---|---|
| 1 | Video Error Count |
| 2 | Unstable Count Measure |
| 3 | Lock Status |
| 4 | HDCP Status |
| 5 | EDID Status |
| 6 | HPD Status |

Node 1C

| No. | ITEMS |
|---|---|
| 1 | Video Error Count |
| 2 | Unstable Count Measure |
| 3 | Lock Status |
| 4 | HDCP Status |
| 5 | EDID Status |
| 6 | HPD Status |

500

SYSTEM INCLUDING A PLURALITY OF DISPLAY APPARATUS AND CONTROL METHOD THEREOF

TECHNICAL FIELD

The disclosure relates to a system with a plurality of display apparatuses connecting with each other to display an image together based on a content signal provided from a content source and a method of controlling the same, and more particularly to a system with a plurality of display apparatuses, which has a structure for identifying a display apparatus having an error in transmitting and processing a content signal within the system, and a method of controlling the same.

BACKGROUND ART

To compute and process predetermined information in accordance with certain processes, an electronic apparatus basically includes a central processing unit (CPU), a chipset, a memory, and the like electronic components for the computation. Such an electronic apparatus may be variously classified in accordance with what information will be processed and what it is used for. For example, the electronic apparatus is classified into an information processing apparatus such as a personal computer (PC), a server or the like for processing general information; an image processing apparatus for processing image data; an audio apparatus for audio process; home appliances for miscellaneous household chores; etc. The image processing apparatus may be actualized by a display apparatus that displays processed image data as an image on its own display panel. As an example of embodying the image processing apparatus by a single display apparatus, there are a TV, a monitor, a portable multimedia player, a tablet computer, a mobile phone, etc. As an example of embodying the image processing apparatus by a plurality of display apparatuses, there is a video wall. The video wall refers to a system that forms a large screen environment by the plurality of display apparatuses arrayed in a matrix form.

There are many methods of transmitting a content signal from a content source to the display apparatuses, and one of them is a loop-out method. The loop-out method refers to a kind of serial connection method by which a content signal output from the content source is input to the first display apparatus, the content signal is branched in the first display apparatus, and the branched content signal is input from the first display apparatus to the second display apparatus. Such an input/output manner is applied to all the display apparatuses in the system.

In the system where the display apparatuses are connected by the loop-out method, there may be various causes that an image is not normally displayed, and the cause may make it difficult to identify which display apparatus among the plurality of display apparatuses has an error. For example, when only one display apparatus among the plurality of display apparatuses does not support high-bandwidth digital content protection (HDCP) under the condition that the HDCP or the like security is applied to the content signal output from the content source, all the display apparatuses may display no image. Because all the display apparatuses do not display any image, it is difficult for a manager to determine which display apparatus the problem is in.

Therefore, a structure or method is required for allowing the manager to easily determine the display apparatus causing an error in the system.

DISCLOSURE

Technical Solution

According to an embodiment of the disclosure, there is provided a display system with a plurality of display apparatuses, the display apparatus including: a display; a signal input/output unit configured to receive an image signal from a display apparatus of a front side and transmit the received image signal to a display apparatus of a back side; a memory configured to store an instruction; and a processor configured to execute the instruction to: display an image on the display based on the received image signal, obtain and store status information showing operation status of the plurality of display apparatuses, and identify whether the plurality of display apparatuses normally operate based on the stored status information, and output result information about the identified normal/abnormal operation.

Here, the processor may receive the status information from other display apparatuses among the plurality of display apparatuses, and store the status information corresponding to each of the plurality of display apparatuses.

Further, the processor may transmit the status information to other display apparatuses among the plurality of display apparatuses through the signal input/output unit, so that the other display apparatuses can store the status information.

Further, the processor may set a plurality of points, at the image signal is transmitted and received, in the display apparatus, and check operation status at the set point to generate the status information.

Here, the point may be set with respect to the signal input/output unit and the processor.

Further, the image signal may include a signal of content including a plurality of image frames, and the processor may identify that the display apparatus is in abnormal status, based on change between the plurality of image frames exceeding a first threshold.

Further, the processor may identify that the display apparatus is in abnormal status, based on a variation rate in noise intensity of the image signal exceeding a second threshold.

Further, the processor may output the result information to be displayed on the display.

According to an embodiment of the disclosure, there is provided a method of controlling a display system with a plurality of display apparatuses, the method including: displaying an image based on a received image signal; obtaining and storing status information showing operation status of the plurality of display apparatuses; and identifying whether the plurality of display apparatuses normally operate based on the stored status information, and outputting result information about the identified normal/abnormal operation.

Here, the status information may be received from other display apparatuses among the plurality of display apparatuses, and the status information may be stored corresponding to each of the plurality of display apparatuses.

Further, the status information may be transmitted to other display apparatuses among the plurality of display apparatuses through the signal input/output unit, so that the other display apparatuses can store the status information.

Further, a plurality of points, at the image signal is transmitted and received, may be set in the display apparatus, and operation status may be checked at the set point to generate the status information.

Here, the point may be set with respect to the signal input/output unit and the processor of the display apparatus.

Further, the image signal may include a signal of content including a plurality of image frames, and it may be identified that the display apparatus is in abnormal status, based on change between the plurality of image frames exceeding a first threshold.

Further, it may be identified that the display apparatus is in abnormal status, based on a variation rate in noise intensity of the image signal exceeding a second threshold.

Further, the result information may be displayed as an image.

DESCRIPTION OF DRAWINGS

FIG. 5 illustrates status information of a plurality of display apparatuses, stored in a display apparatus according to an embodiment of the disclosure.

MODE FOR INVENTION

Below, embodiments will be described in detail with reference to accompanying drawings. Further, the embodiments described with reference to the accompanying drawings are not exclusive to each other unless otherwise mentioned, and a plurality of embodiments may be selectively combined within one apparatus. The combination of these plural embodiments may be discretionally selected and applied to realize the present inventive concept by a person having an ordinary skill in the art.

In the description of the embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the disclosure.

Further, a term "at least one" among a plurality of elements in the disclosure represents not only all the elements but also each one of the elements, which excludes the other elements or all combinations of the elements.

Figure 1:
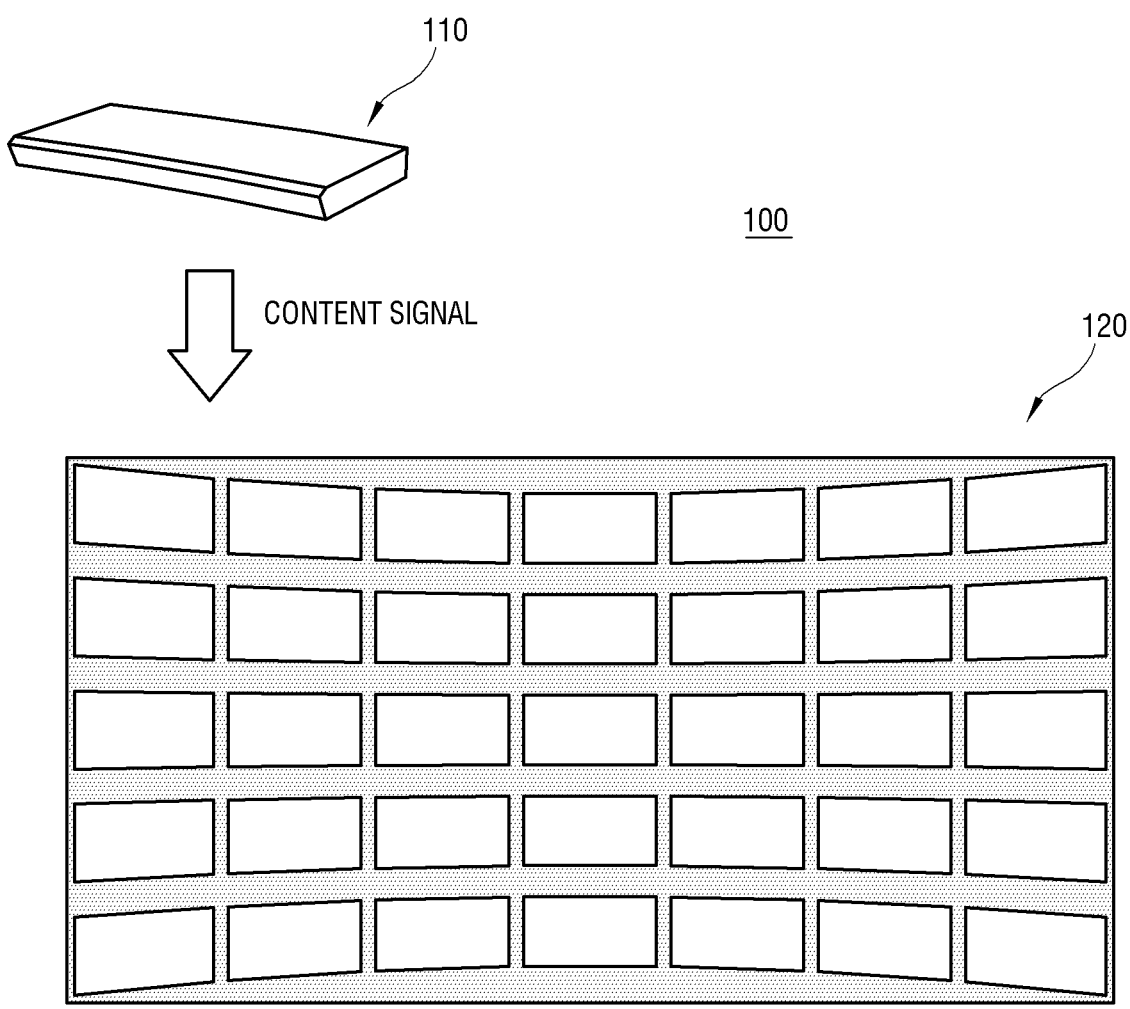
FIG. 1 illustrates a video wall system according to an embodiment of the disclosure.

FIG. 1 illustrates a video wall system according to an embodiment of the disclosure.

As shown in FIG. 1, a system 100 according to an embodiment includes a plurality of display apparatuses 120. The plurality of display apparatuses 120 are arranged in parallel to form a matrix and thus constitute a video wall system forming a large screen. For example, a digital signage installed outdoors or in an opened place needs to have a large screen so that a lot of people can easily recognize content displayed on the screen even at a long distance. However, there are manufacturing limitations on a single screen size of a typical display apparatus 120, and therefore many display apparatuses 120 make up the video wall to thereby achieve the digital signage having a large screen.

The display apparatuses 120 of the system 100 receive content signals from a content source 110, and individually process and display the received content signals. For example, each display apparatus 120 selects and displays only an area, which corresponds to its position arranged in the system 100 or its own identification (ID) in the system 100, of the whole area of an image frame of the content signal. In other words, the plurality of display apparatuses 120 divisionally display their corresponding partial areas of the image frame, so that the system 100 can generally display the whole area of the image frame.

According to an embodiment, the system 100 is realized as the video wall by way of example. However, the plurality of display apparatuses 120 does not need to be unconditionally arranged in a matrix form, but may be designed in other forms than the matrix form.

There are many methods by which the content source 110 provides the content signal to the plurality of display apparatuses 120. In this embodiment, the loop-out method is employed. For example, when the content source 110 transmits the content signal to the first display apparatus among the plurality of display apparatuses 120, the control signal diverges in the first display apparatus, in which one of the divergent content signal is transmitted to the processor of the first display apparatus and the other one is transmitted to the second display apparatus. A transmission structure for the content signal between the apparatuses may employ a cable and wireless communication. For convenience, a signal transmission type, in which the plurality of display apparatuses 120 are connected in series like this and the content signal is transmitted from the content source 110 to the display apparatuses 120 in sequence, will be called a loop-out type.

Below, a signal transmission structure between the plurality of display apparatuses 120 connected by the loop-out method will be described in more detail.

Figure 2:
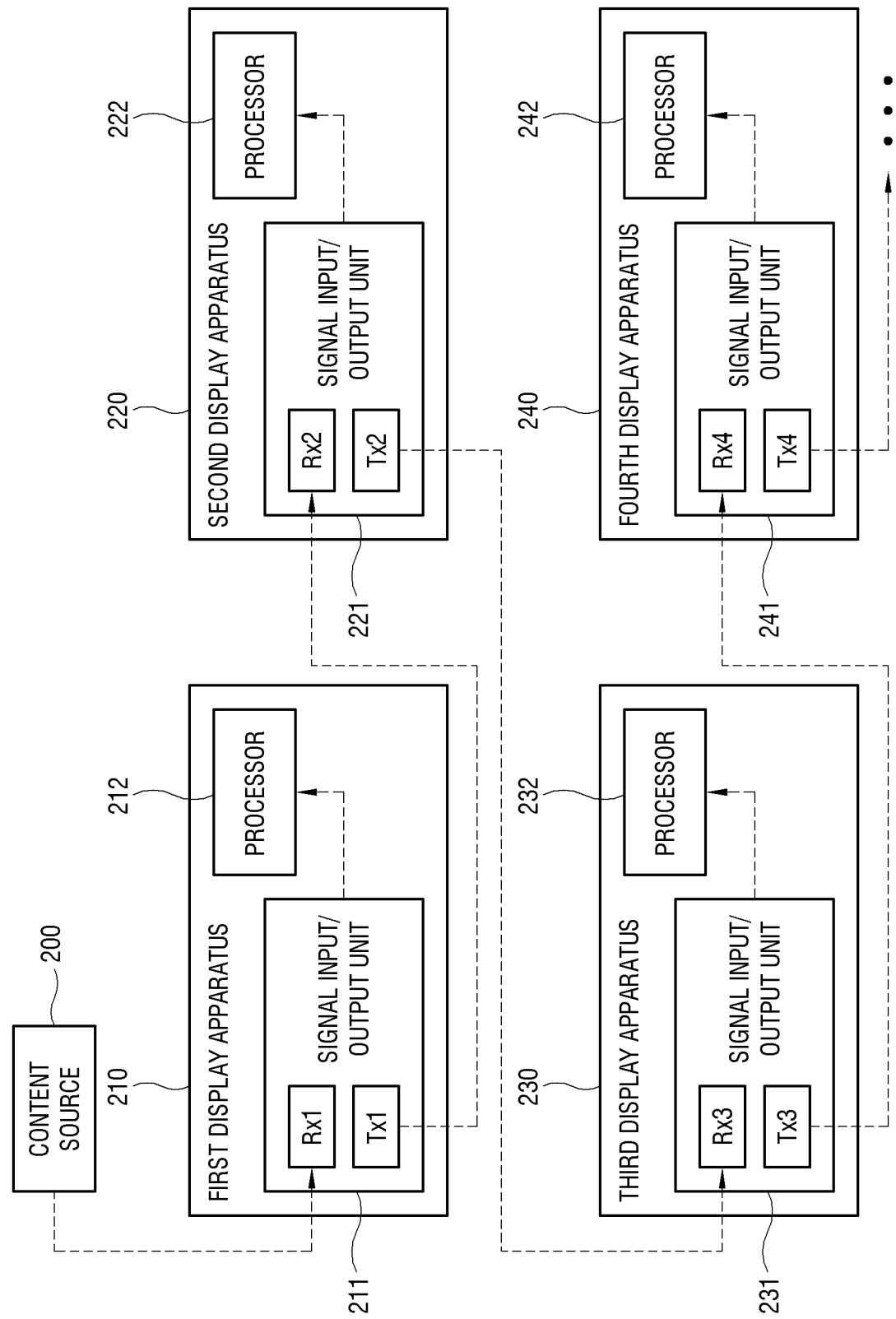
FIG. 2 is a block diagram showing signal transmission relations between a plurality of display apparatuses in a system according to an embodiment of the disclosure.

FIG. 2 is a block diagram showing signal transmission relations between a plurality of display apparatuses in a system according to an embodiment of the disclosure.

As shown in FIG. 2, a plurality of display apparatuses 210, 220, 230 and 240 are connected by the loop-out method. In this embodiment, four display apparatuses 210, 220, 230 and 240 are connected by the loop-out method, but more display apparatuses 210, 220, 230 and 240 may be connected one after another by the method described in this embodiment.

The plurality of display apparatuses 210, 220, 230 and 240 includes a first display apparatus 210, a second display apparatus 220, a third display apparatus 230 and a fourth display apparatus 240 connected in sequence. According to an embodiment, the connection between the apparatuses are achieved by a cable that meets high definition multimedia interface (HDMI) standards, and there are no limits to the connection method and standards. For example, the connection between the apparatuses may be performed by wireless communication, or not the HDMI standards but DisplayPort or the like separate standards may be applied to the connection.

The plurality of display apparatuses 210, 220, 230 and 240 include signal input/output units 211, 221, 231 and 241 for signal input/output, and processors 212, 222, 232 and 242 for signal process. Further, the signal input/output units 211, 221, 231 and 241 include receivers Rx1, Rx2, Rx3 and Rx4 for the signal input, and transmitters Tx1, Tx2, Tx3 and Tx4 for the signal output. The display apparatuses 210, 220, 230 and 240 basically include such hardware configurations even though their models or detailed hardware specifications may be the same with or different from one another.

A content signal is delivered as follows. A content source 200 outputs the content signal to Rx1 of the signal input/output unit 211 of the first display apparatus 210. The signal input/output unit 211 of the first display apparatus 210 delivers the content signal to a processor 212 of the first display apparatus 210, and outputs the content signal to the second display apparatus 220 through Tx1. On the same principle as that of the first display apparatus 210, the second display apparatus 220 delivers and processes the content signal received in Rx2. In such a manner, the content signal from the content source 200 is delivered to all the display apparatuses 210, 220, 230 and 240.

Meanwhile, the plurality of display apparatuses 210, 220, 230 and 240 may exchange information with one another through the signal input/output units 211, 221, 231 and 241. For example, a control signal or information may be exchanged between the apparatuses through a display data channel (DDC) when the apparatuses are connected by the HDMI standards, and a control signal or information may be exchanged between the apparatuses through an AUX channel when the apparatuses are connected by the DisplayPort standards.

With this structure, an image based on the content signal may not be normally displayed in the system because of an error caused by various factors such as a bad connection, content security authentication, a bad connection of internal wiring, etc. during the transmission of the content signal.

In this embodiment, each of the plurality of display apparatuses 210, 220, 230 and 240 may identify the display apparatuses 210, 220, 230 and 240, in which such an error occurs, among the plurality of display apparatuses 210, 220, 230 and 240 in the system. Further, the display apparatuses 210, 220, 230 and 240 may autonomously set a plurality of nodes in the corresponding display apparatuses 210, 220, 230 and 240, and identify an error at each node. Here, the nodes are set as targeted for points where the content signal is transmitted and received, among the hardware configuration in the display apparatuses 210, 220, 230 and 240. For example, the receivers Rx1, Rx2, Rx3 and Rx4 in which the content signal is received from the outside, the processors 212, 222, 232 and 242 in which the content signal is received from the signal input/output units 211, 221, 231 and 241, and the transmitters Tx1, Tx2, Tx3 and Tx4 from which the control signal is output to the outside may be set as the nodes in the display apparatuses 210, 220, 230 and 240. Details of such a method of identifying an error will be described later.

Below, the hardware configuration of one among the display apparatuses 210, 220, 230 and 240 will be described.

Figure 3:
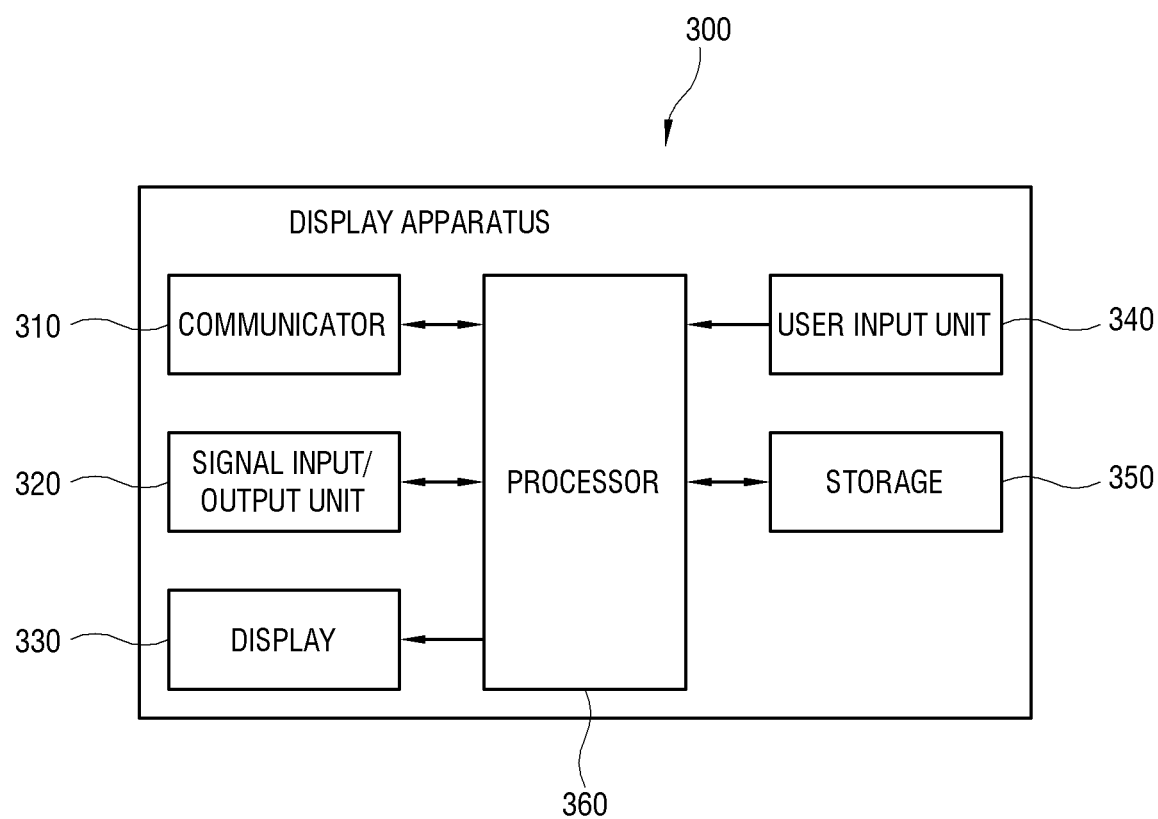
FIG. 3 is a block diagram of a display apparatus in a system according to an embodiment of the disclosure.

FIG. 3 is a block diagram of a display apparatus in a system according to an embodiment of the disclosure.

As shown in FIG. 3, a display apparatus 300 includes a communicator 310 which communicates with an external apparatus, a signal input/output unit 320 through which the content signal or the like predetermined data is input/output, a display 330 which displays an image, a user input unit 340 which allows a user to make an input, a storage 350 in which the data is stored, and a processor 360 which processes the data.

The communicator 310 refers to an interactive communication circuit that includes at least one of elements, such as a communication module, a communication chip, etc. corresponding to various wired and wireless communication protocols. For example, the communicator 310 may be embodied by a wireless communication module that performs wireless communication with an access point (AP) through Wi-Fi, or a local area network (LAN) card that is connected to a router or a gateway by a wire.

The signal input/output unit 320 is connected to a predetermined external apparatus by one-to-one or one-to-many wired connection, thereby receiving data from or outputting data to the external apparatus. The signal input/output unit 320 may for example include a connector, a port, etc. based on preset transfer protocols, such as an HDMI port, DisplayPort, a universal serial bus (USB) port, etc. According to an embodiment, the signal input/output unit 320 may be connected to other display apparatuses or content source.

The display 330 includes a display panel capable of displaying an image on a screen. The display panel is provided to have a light receiving structure such as a liquid crystal type, or a self-emissive structure such as an organic light emitting diode (OLED) type. The display 330 may include an additional element according to the structures of the display panel. For example, when the display panel is the liquid crystal type, there are added a backlight unit configured to emit light to a liquid crystal display panel, a panel driving substrate configured to drive liquid crystal of the liquid crystal display panel, etc.

The user input unit 340 includes various input interfaces through which a user can make an input. The user input unit 340 may be variously configured according to the kinds of display apparatus 300, and may for example include mechanical or electronic buttons of the display apparatus 300, a remote controller separated from the display apparatus 300, a touch pad, a touch screen provided on the display unit 330, etc.

The storage 350 is accessed by the processor 360, and performs operations such as reading, recording, modifying, deleting, updating, etc. for data under control of the processor 360. The storage 350 includes a flash memory, a hard disk drive (HDD), a solid status drive (SSD), and the like nonvolatile memory in which data is retained regardless of whether power is supplied or not; and a buffer, a random access memory (RAM) and the like volatile memory to which processing data is loaded.

The processor 360 includes one or more hardware processors embodied by a central processing unit (CPU), a chipset, a microcontroller, a circuit, etc. which are mounted on a printed circuit board (PCB). Alternatively, the processor 360 may be designed as a system on chip (SoC). The main processor 360 includes modules corresponding to various processes, such as a demultiplexer, a decoder, a scaler, an audio digital signal processor (DSP), an amplifier, etc., and some or all among such modules may be embodied by the SoC. For example, a demultiplexer, a decoder, a scaler, and the like module related to an image process may be achieved as an image processing SoC, and an audio DSP may be achieved as a chipset separated from the SoC.

The processor 360 serves as main hardware for carrying out general operations of the display apparatus 300. In other words, the processor 360 executes a preset instruction stored in the storage 350 to thereby perform operations of the display apparatus 300. From a software point of view, a predetermined operation of the display apparatus 300 may be performed by an operating system or a kernel or by an application to be executed on the kernel, and the processor 360 performs calculation, process and control for data to execute the software. For example, the processor 360 executes the operating system or the kernel of the display apparatus 300, and also executes the application and the program on the kernel, thereby performing the processes.

The processor 360 processes the content signal received through the signal input/output unit 320. When the content signal has attributes of image content, the processor 360 makes the display 330 to display an image based on the content signal. According to an embodiment, the processor 360 may identify which one among the plurality of display apparatuses in the system has an error, just in case the display 330 cannot normally display an image.

Below, a method by which a display apparatus according to an embodiment identifies a certain display apparatus, in which an error occurs, in a system will be described.

Figure 4:
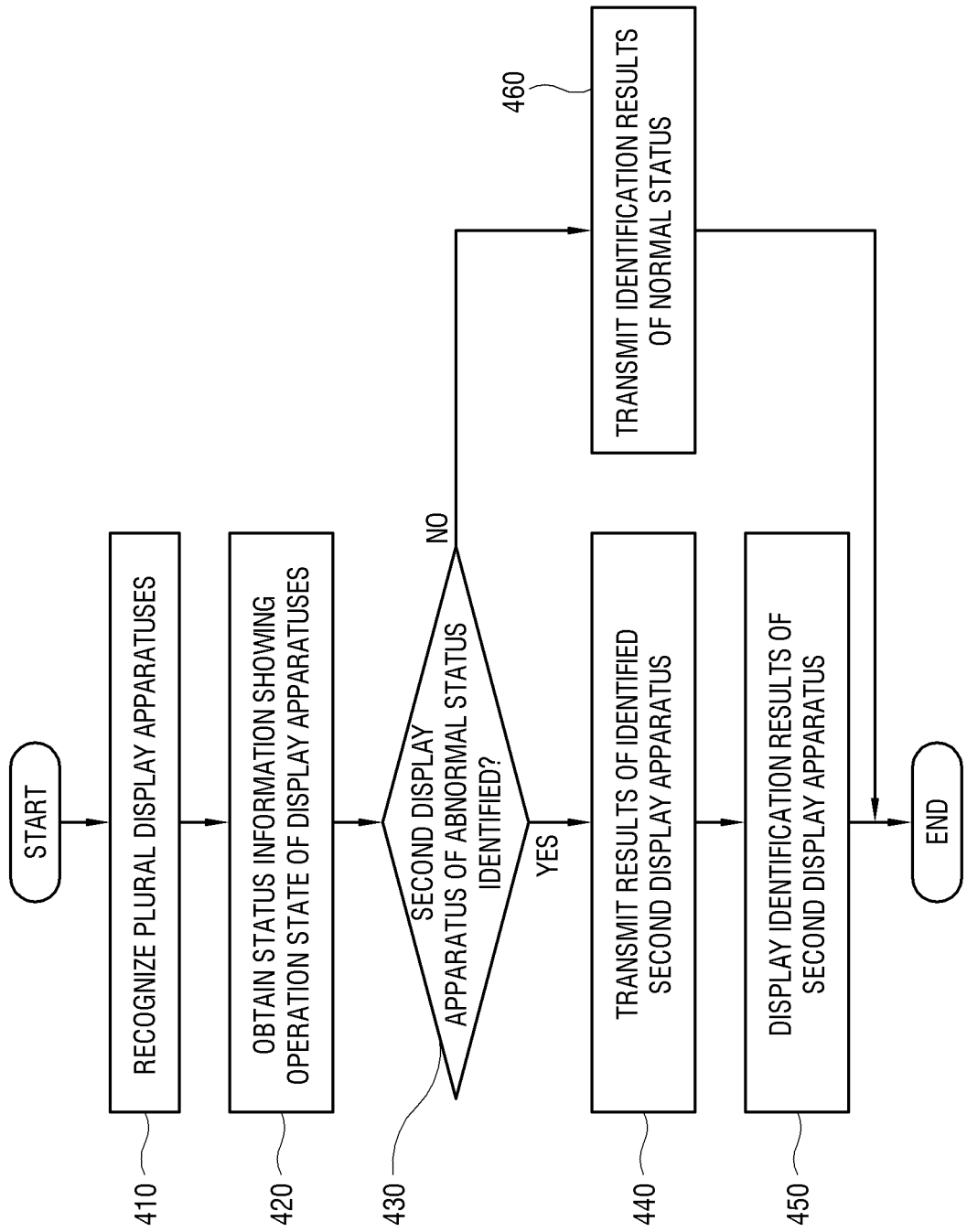
FIG. 4 is a flowchart showing a control method of a display apparatus according to an embodiment of the disclosure.

FIG. 4 is a flowchart showing a control method of a display apparatus according to an embodiment of the disclosure.

As shown in FIG. 4, the following processes are performed by a processor of each display apparatus in a system.

At operation 410 a first display apparatus recognizes a plurality of display apparatuses connected to one another in the system. For example, the plurality of display apparatuses may be connected to one another by the HDMI standards, and in this case they can recognize each other through the DDC. The first display apparatus identifies a total number of display apparatuses connected to one another, and a sequence of the display apparatuses connected by the loop-out method, thereby distinguishing each of the display apparatuses.

At operation 420 the first display apparatus obtains status information showing operation status of the plurality of recognized display apparatuses. For example, the display apparatuses autonomously check current status, and share check results with each other.

At operation 430 the first display apparatus identifies whether there is a second display apparatus operating abnormally based on the obtained status information. In other words, the first display apparatus receives and stores the status information received from the plurality of display apparatuses, and identifies the abnormal display apparatus based on the stored status information. Here, the first display apparatus periodically receives the status information from the display apparatuses, thereby updating the previously stored status information.

When the second display apparatus operating abnormally is identified, at operation 440 the first display apparatus transmits an identification result of the second display apparatus to the plurality of display apparatuses. Thus, all the display apparatuses but the first display apparatus among the plurality of display apparatuses may update their previously stored status information based on the identification result.

At operation 450 the first display apparatus displays the identification result of the second display apparatus. Here, the identification result of the second display apparatus may be displayed on a separately designated display apparatus other than the first display apparatus.

On the other hand, when it is identified that all the display apparatuses operate normally without any second display apparatus operating abnormally, at operation 460 the first display apparatus transmits the identification result of the normal status to the plurality of display apparatuses.

Thus, the display apparatus may identify an display apparatus, in which an error occurs, among the plurality of display apparatuses, and inform a user of the identified display apparatus.

The foregoing process may be performed by a certain display apparatus among the plurality of display apparatuses in the system. Alternatively, the foregoing process may be not performed by only one among the plurality of display apparatuses but equally performed by the plurality of display apparatuses. Below, merits of when the process is individually and equally performed in the plurality of display apparatuses will be described.

Among the plurality of display apparatuses, all the display apparatuses have the same probability of an error. In other words, if only one display apparatus is able to perform the process for identifying an error, it is difficult to cope with a case where an error occurs in the corresponding display apparatus.

Further, due to the nature of a video wall for a large screen, a manager of the system does not have the same accessibility to all the display apparatuses. For example, in the system installed standing on the ground, it is easy for a manager to access the display apparatus installed at a lower side, but it is difficult to access the display apparatus installed at an upper side. Further, the display apparatus to which the manager can have an easy access in the system may be varied depending on installation positions, installation shapes, installation environments, etc.

Therefore, according to an embodiment, all the display apparatuses are subjected to the same process, so that the manager can easily determine the display apparatus, in which an error occurs, by accessing any display apparatus.

As described in this embodiment, the first display apparatus obtains and stores the status information showing the operation status of the plurality of display apparatuses connected by the loop-out method, and updates the previously stored status information with the status information periodically obtained from the display apparatuses. Here, the first display apparatus may identify an error based on the status information in units of not individual apparatuses but the nodes of the apparatuses.

In the foregoing embodiment, the plurality of display apparatuses in the system implement the error identifying processes, respectively. Thus, although a problem arises in one display apparatus, the manager can easily recognize the problem of the system through the other display apparatuses.

However, the whole operations or some operations of the error identifying process may be designed to be performed by not the plurality of display apparatuses but the content source or a separate electronic apparatus, and this embodiment will be described below.

The error identifying processes schematically include a first operation of obtaining the status information of the plurality of display apparatuses connected by the loop-out method in the system; a second operation of storing the status information about the plurality of display apparatuses; a third operation of identifying a display apparatus, in which an error occurs, among the plurality of display apparatuses, based on the stored status information; and a fourth operation of outputting an error identification result to be recognizable by a user. Such operations may be performed by one among various apparatuses such as the display apparatuses, a separate electronic apparatus for managing the plurality of display apparatuses, a content source, a server, etc. or may be divisionally performed by the plurality of apparatuses.

For example, in connection with the first operation, the electronic apparatus may obtain the status information from the display apparatuses. In connection with the second operation, the electronic apparatus may store the obtained status information, or a server communicating with at least one among the plurality of display apparatuses may store the status information of the display apparatus. In connection with the third operation, the electronic apparatus or the server may identify the display apparatus, in which an error occurs, based on the stored status information. In connection with the fourth operation, the electronic apparatus may display the error identification result. The foregoing examples are merely some among various cases of workshop modification, and there are no limits to a case where a specific operation is performed only in a specific apparatus.

Below, it will be described that the first display apparatus stores the status information of the plurality of display apparatuses.

FIG. 5 illustrates status information of a plurality of display apparatuses, stored in a display apparatus according to an embodiment of the disclosure.

As shown in FIG. 5, a display apparatus obtains and stores status information 500 of the plurality of display apparatuses connected by the loop-out method. If each individual display apparatus is called a set and each individual set includes a plurality of nodes, the status information 500 includes a plurality of items in units of nodes in the set, and a parameter about each item. Here, the node refers to a reference point previously set in the set, and the node in the set for example includes a signal input point for receiving a signal, a signal output point for outputting a signal, and a processor for receiving the signal from the signal input point.

Each set performs an initialization process when it is first powered on. For example, when the plurality of sets form a loop-out connection based on the HDMI standards, the sets connected to each other are recognized through the DDC during the initialization process, and the sets are assigned with index numbers for identifying the recognized sets. For example, when a total of ten sets are recognized as connected by the loop-out method, the ten sets may be assigned with identification names such as SET 1, SET 2, SET 3, etc. in order of connection with respect to the content source.

Further, each set shares its own status information 500 with the other sets, so that each set can obtain the status information 500 of all the ten sets. Each set periodically broadcasts its own status information 500, and updates the previously stored status information 500 with the status information 500 broadcasted from the other sets. Thus, all the sets may store the same status information 500 at the same point in time.

Each set checks a parameter of an item corresponding to each node of the stored status information 500. When a parameter of a certain item is abnormal, a signal showing that the corresponding node is abnormal is output. For example, it is checked that the fourth item of the node 1B is abnormal, the manager can be informed that an error occurs in the node 1B of the SET 1 and a problem arises in the HDCP status of the node 1B.

Below, the content of the status information 500 will be described. In this embodiment, six items are given by way of example, and not all the six items but some items may be applied to the status information 500.

The items corresponding to each individual node in the status information 500 includes Video Error Count, Unstable Count Measure, Lock Status, HDCP Status, Extended Display Identification Data EDID) Status, Hot Plug Detect (HDP) Status, etc. Of course, the status information 500 may be designed to include other items than such six items, or include not more than six items.

Video Error Count refers to an item for checking whether one signal is given to all the nodes. The sets need to receive the same content signal in order to unite in displaying an image.

Unstable Count Measure refers to an item for checking whether noise of each node is within an allowable range. Due to the nature of the loop-out connection, noise checked in units of nodes or in units of sets increases as the connection order of the plurality of sets goes from earlier connection toward later connection. Nevertheless, the increase of the noise needs to be within the allowable range in order to display an image normally.

Above two items will be described later in more detail. Below, the other items of the status information 500 will be described.

Lock Status refers to an item for indicating whether the plurality of sets are connected for communication with one another when the plurality of sets are connected based on the HDMI standards. For the loop-out connection, the lock status of each node needs to be on. When the lock status of a certain node is not on, an image is not normally displayed on the sets in the whole system.

HDCP Status refers to an item for indicating whether an encrypted content signal in the set is decryptable. To display the encrypted content signal as an image, the set needs to decrypt the encrypted content signal. According to the HDCP, decryption needs a decryption key. When the set does not include the decryption key or the decryption key has an error, the corresponding set cannot normally perform the decryption.

In a case of content to which the HDCP is applied, when only one node among the nodes of the sets in the whole loop-out system is abnormal, the content source does not output a content signal to the sets, and therefore no images are displayed on the whole sets. Thus, it is possible to identify which node has a problem by checking HDCP Status of the nodes.

EDID Status refers to an item for indicating whether each set is able to normally provide EDID. The EDID is information about various device attributes of the corresponding set. One set identifies the device attributes of the other sets based on the EDID provided from the other sets.

HPD Status refers to an item for indicating whether the set or node normally connects with other sets based on the HDMI standards. When an HPD signal for the set at a receiving side is abnormal, the set at a transmitting side does not output the signal to the side at the receiving side. By checking the HPD Status, a manager can cope with compatibility issues between many sets.

Below, some items of the status information 500 will be described in more detail.

Figure 6:
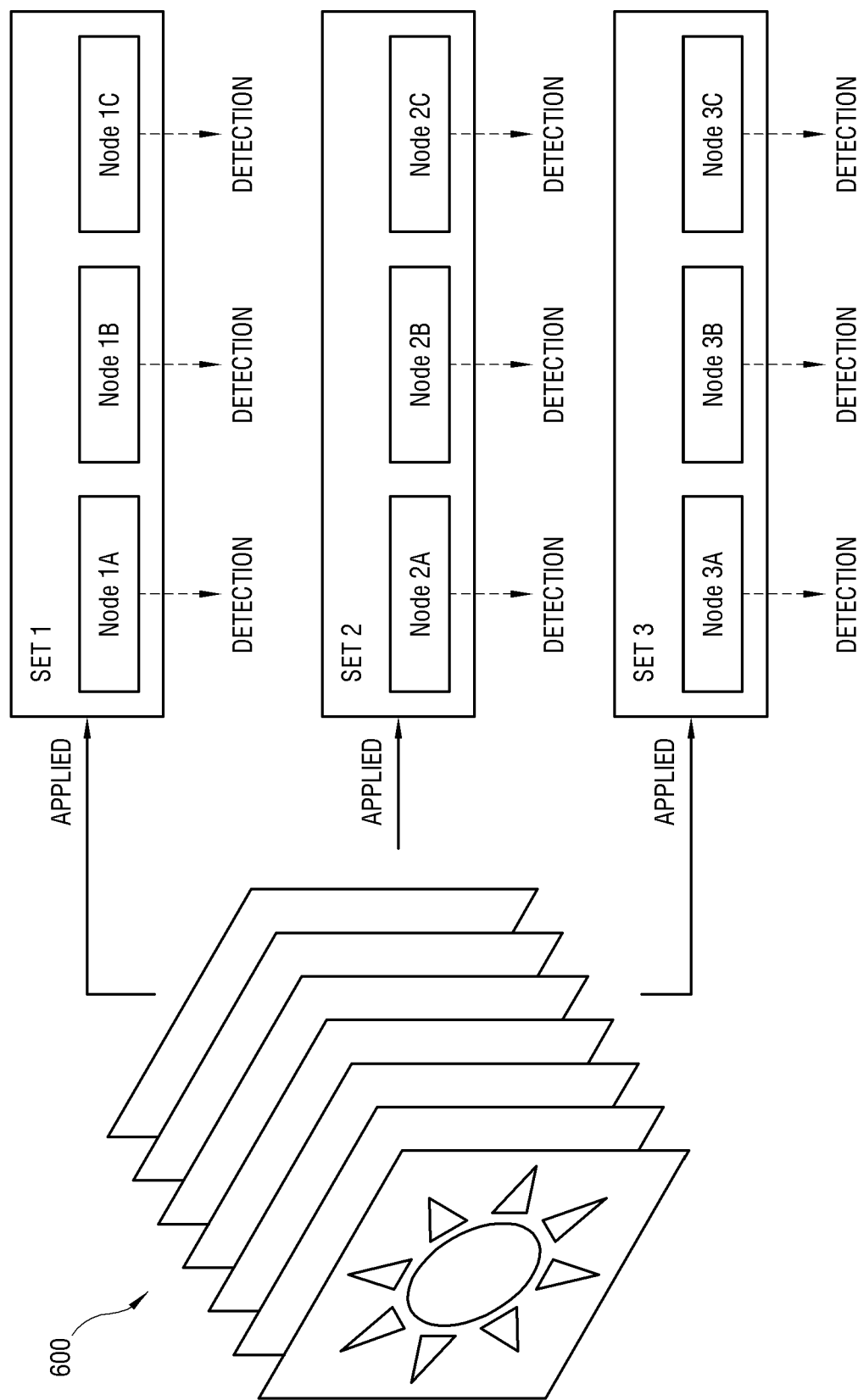
FIG. 6 illustrates a principle that a display apparatus according to an embodiment of the disclosure applies an image of a preset test pattern to nodes to obtain status information.

FIG. 6 illustrates a principle that a display apparatus according to an embodiment of the disclosure applies an image of a preset test pattern to nodes to obtain status information.

As shown in FIG. 6, the display apparatus identifies a Video Error Count parameter of each node by the following method. The display apparatus generates a test signal 600 including a plurality of image frames having a preset test pattern. The test pattern may have any shape with any color, and may be provided as a blank. However, all the plurality of image frames in the test signal 600 need to have the same test pattern. For example, when the test pattern is provided as the blank, all the image frames of the test signal 600 need to have the blank.

The display apparatus applies the test signal 600 to the sets for a predetermined period of time, and each node of the sets obtains a result of detecting the test signal 600. When the test signal 600 is applied to the sets, the sets return the result of the test signal 600 detected at the nodes to the display apparatus.

When all the plurality of image frames detected at a specific node of a specific set are of the same content, in other words, when all the plurality of image frames have the same test pattern while the test signal 600 is applied, the display apparatus identifies that the item of Video Error Count is normal at the corresponding node. On the other hand, when all the plurality of image frames detected at a specific node of a specific set are of different pieces of content, in other words, when some image frames are different in test pattern from the other image frames while the test signal 600 is applied, the display apparatus identifies that the item of Video Error Count is abnormal at the corresponding node.

The display apparatus may identify whether the image frames are changed in test pattern, based on comparison in RGB data between the image frames obtained from the node.

Such an abnormal case may be caused by a problem of PCB design, a cable loss, etc. at the corresponding node.

For example, when it is detected that all the plurality of image frames in the test signal 600 have the same test pattern at the node 1B of the SET 1, the item of Video Error Count at the node 1B is regarded as normal. On the other hand, when it is detected that some image frames among the plurality of image frames in the test signal 600 have different test patterns at the node 3A of the SET 3, the item of Video Error Count at the node 3A is regarded as abnormal.

Figure 7:
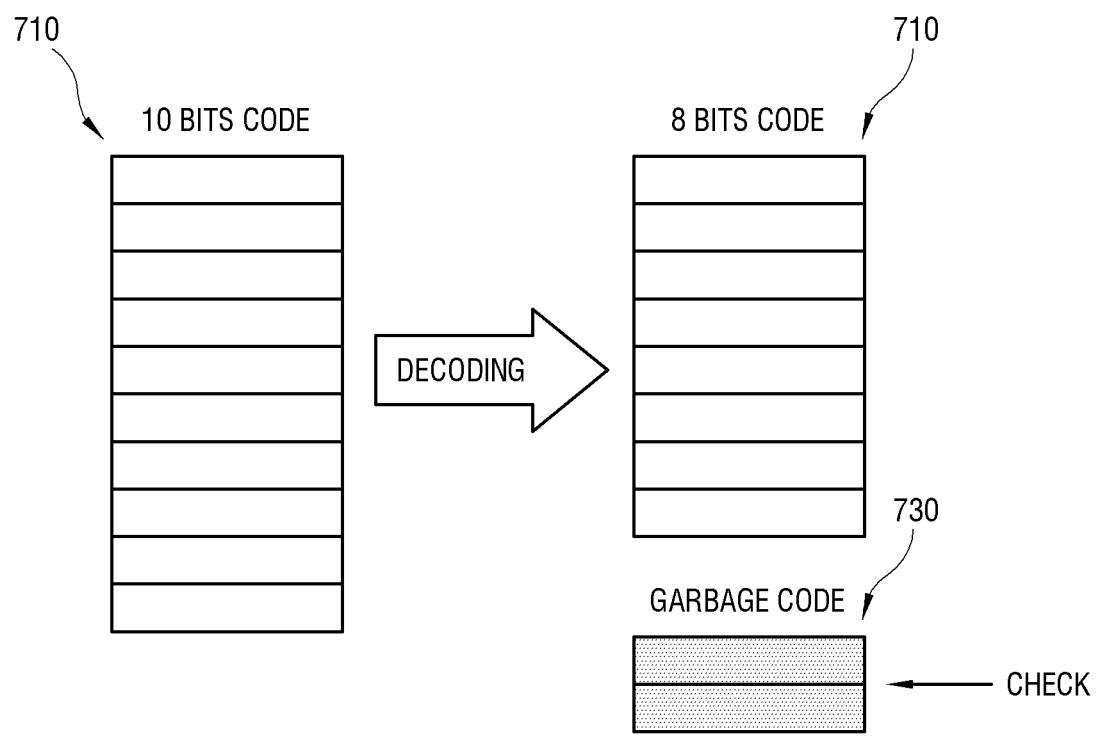
FIG. 7 illustrates a principle of detecting an error when data is decoded at a node of a display apparatus according to an embodiment of the disclosure.

FIG. 7 illustrates a principle of detecting an error when data is decoded at a node of a display apparatus according to an embodiment of the disclosure.

As shown in FIG. 7, content data may be decoded at a specific node of the display apparatus. For example, it will be assumed that an American national standards institute (ANSI) original data code 710 of 10 bits is decoded into a converted data code 720 of 8 bits. In this case, 2 bits remaining after converting 10 bits into 8 bits are regarded as a garbage code 730. Substantive content of the original data code 710 is included in the converted data code 720, and it is therefore normal that the garbage code 730 does not include the substantive content.

Thus, the display apparatus checks the garbage code 730 generated by the decoding at the node, and identifies whether the garbage code 730 includes the substantive content of the original data code 710. The display apparatus identifies the corresponding node is in abnormal status when the garbage code 730 includes the substantive content, but identifies the corresponding node is in normal status when the garbage code 730 does not include the substantive content.

Figure 8:
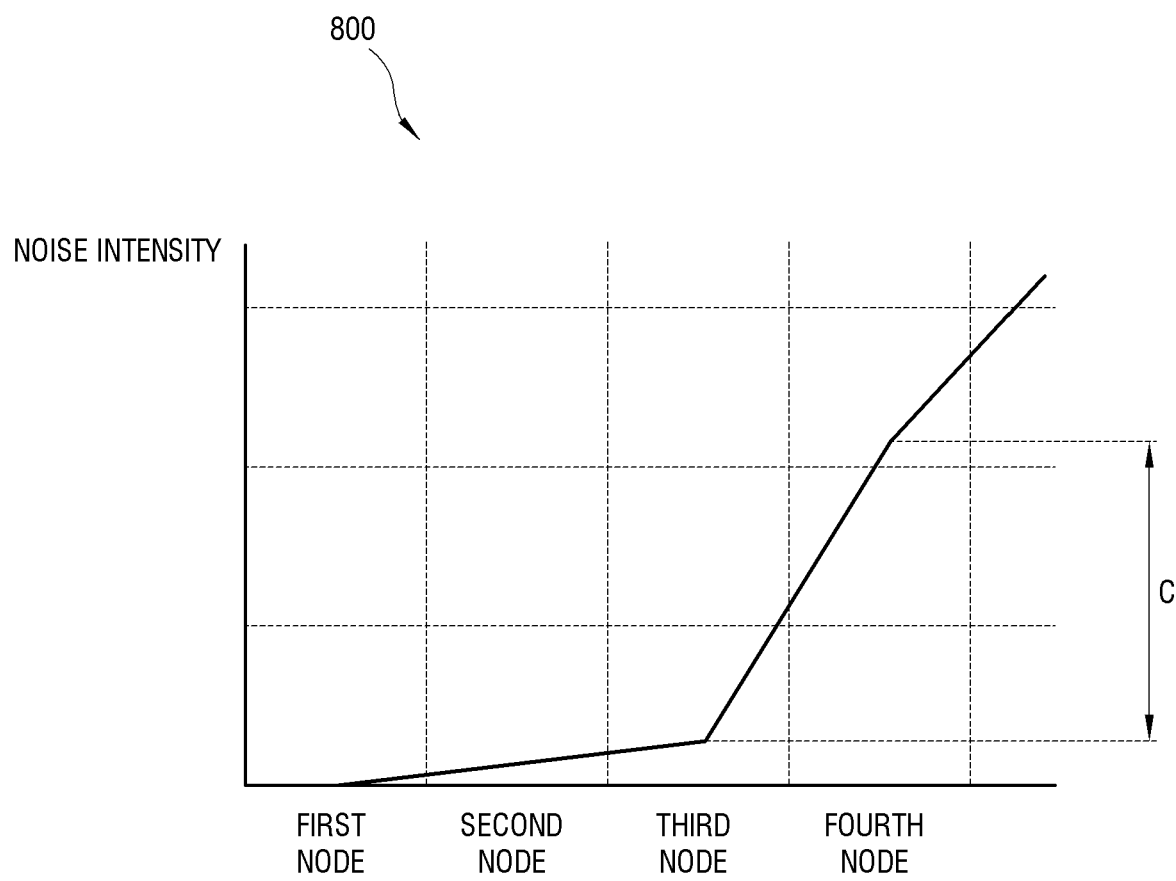
FIG. 8 is a graph showing change in noise intensity detected at nodes of a display apparatus according to an embodiment of the disclosure.

FIG. 8 is a graph showing change in noise intensity detected at nodes of a display apparatus according to an embodiment of the disclosure.

As shown in FIG. 8, noise intensity is checked at the nodes of the plurality of display apparatuses, and check results are shows on a graph 800. In the graph 800, the horizontal axis indicates a plurality of nodes arranged in order of the loop-out connection. Here, the nodes on the horizontal axis have earlier loop-out connection as closer to the origin, and have later loop-out connection as farther away from the origin.

Due to the nature of the loop-out structure having a repetitive pattern in which the content signal output from the content source is input to the display apparatus and then output to the subsequent display apparatus, the noise intensity detected at the set or node increases little by little as the corresponding set or node has later loop-out connection. However, when the noise intensity increases not gently but suddenly from the specific node, in other words, when a variation in the noise intensity from the specific node to the next node exceeds a threshold or a variation rate of the noise intensity at the specific noise exceeds a threshold, it may be regarded that the corresponding specific node is in abnormal status.

For example, FIG. 8 shows that the noise intensity gently increases between a first node and a second node and between a second node and a third node and its variation is not relatedly large within a preset allowable range. In this case, it is regarded that the first node and the second node are at least in the normal status.

On the other hand, the noise intensity suddenly increases between a third node and a fourth node. When a variation C in the noise intensity between the third node and the fourth node exceeds a preset threshold, it is regarded that the third node is in abnormal status. For example, such a phenomenon may be caused when a cable connection error occurs at the third node.

Thus, the display apparatus can identify which set has an error among the plurality of sets forming the loop-out connection, and informs a manager or a user of identification results so that the manager or the user can cope with the error.

Below, it will be described that the display apparatus displays the identification results.

Figure 9:
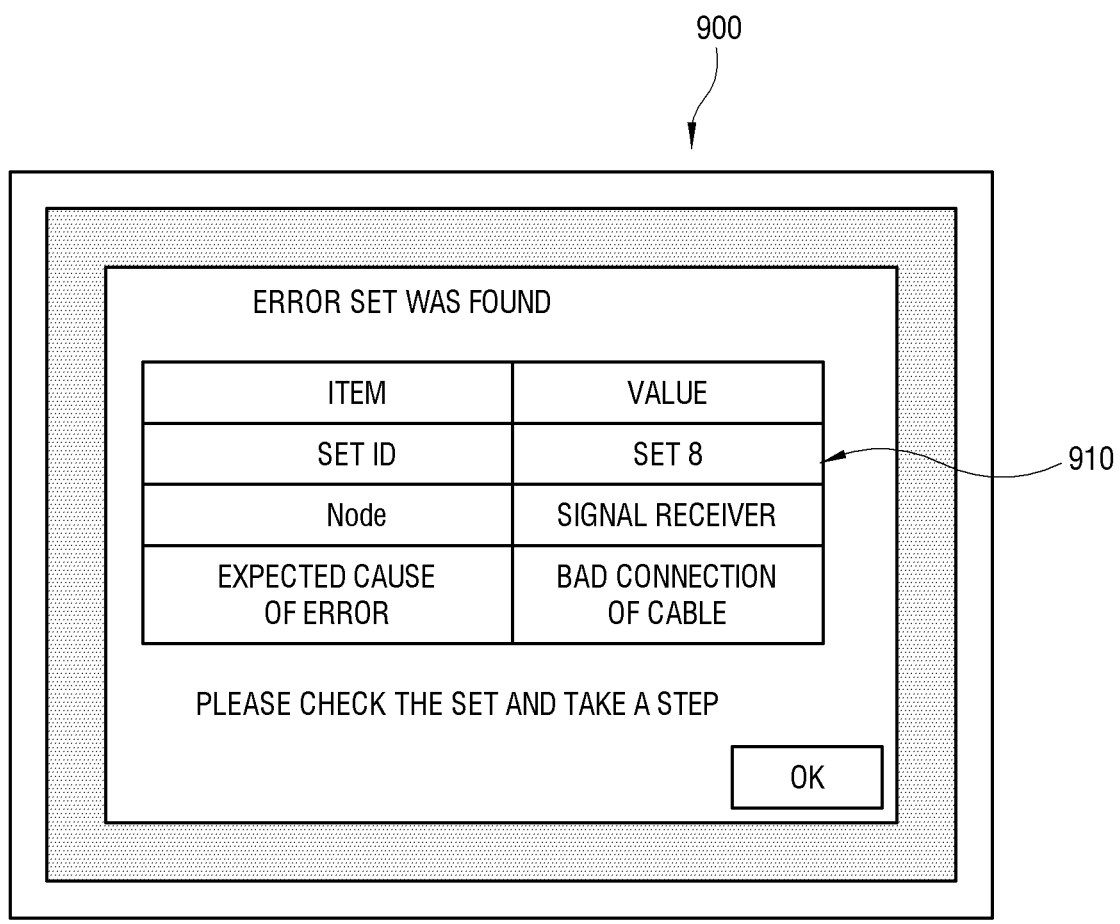
FIG. 9 illustrates that a display apparatus according to the disclosure displays information about a set of abnormal status.

FIG. 9 illustrates that a display apparatus according to the disclosure displays information about a set of abnormal status.

As shown in FIG. 9, when a set of abnormal status is identified among a plurality of sets, a display apparatus 900 displays a user interface (UI) 910 including error information related to the corresponding set, thereby informing a user of the set having an error. The method of identifying the set having the abnormal status is the same as described above.

The display apparatus 900 may autonomously display the UI 910, or may allow other sets to display the UI 910. The display apparatus 900 may allow only some sets among the plurality of sets to display the UI 910, or may allow all the plurality of sets to display the same UI 910. Alternatively, the display apparatus 900 may perform wireless communication with a previously registered mobile apparatus of a manager, and allow the corresponding mobile apparatus to display the UI 910.

The UI 910 includes information about items such as an identification name of a set in which an error occurs, a node at which the error occurs in the corresponding set, an expected cause of the error, etc. Here, the UI 910 is displayed for the purpose of allowing a manager to perform maintenance based on the information of the UI 910, and therefore the items need to show information recognizable by the manager. For example, a value of the node at which an error occurs in the set is not the value of the node to be identified by the display apparatus 900, but a typically used term.

In the UI 910, the expected cause of the error may be selected among causes corresponding to values checked in the status information by the display apparatus 900. For example, when the item of Unstable Count Measure is abnormal in the status information, the display apparatus 900 identifies a bad connection of a cable and records it in the UI 910.

In this way, the display apparatus 900 can display result information to inform a user of the result information about an error.

In the foregoing embodiments, each of the plurality of display apparatuses detects an error in units of nodes. However, the concept of the disclosure is not limited to only such a method but various alternative embodiments are possible.

For example, a case where an error is detected at one node of one display apparatus and a case where an error is detected at a plurality of nodes or all the same nodes of the plurality of display apparatuses may be different in a cause of the error. Specifically, when an error is detected at Rx of one display apparatus, the error may be caused by a bad connection of a cable. On the other hand, a plurality of or all the display apparatuses have an error detected at Rx in common, the error may be unlikely caused by a bad connection of a cable, and it is regarded that there is a problem with a circuit design for Rx of the display apparatus.

Like this, when an error is detected, it is possible to perform operations of analyzing the cause of the error, and providing analysis results and solutions to a user. Such operations may be performed by the display apparatuses. Alternatively, when system sources of a display apparatus are not suitable for the corresponding operations, a server connected to the display apparatus may receive an error detection result from the display apparatus, analyze a cause based on the received result, and allow the display apparatus to display a notification.

The instructions for the operations of the apparatus described in the foregoing embodiments may be implemented by artificial intelligence provided in the corresponding apparatus. The artificial intelligence may be applied to various general systems by utilizing a machine learning algorithm. An artificial intelligence system refers to a computer system with intelligence of a human or being second to a human. In such a system, a machine, an apparatus or a system autonomously performs leaning and identifying and is improved in accuracy of recognition and identification based on accumulated experiences. The artificial intelligence is based on elementary technology by utilizing machine learning (deep-running) technology and algorithms based on an algorithm of autonomously classifying and learning features of input data, and copying perception, identification and the like functions of a human brain.

The elementary technology may for example include at least one of language comprehension technology for recognizing a language and a text of a human, visual understanding technology for recognizing a thing like a human sense of vision, inference and prediction technology for identifying information and logically making inference and prediction, knowledge representation technology for processing experience information of a human into knowledge data, and motion control technology for controlling a vehicle's automatic driving or a robot's motion.

Here, linguistic comprehension refers to technology of recognizing, applying and processing a human's language or text, and includes natural language processing, machine translation, conversation system, question and answer, voice recognition and synthesis, etc.

Inference and prediction refer to technology of identifying information and logically making prediction, and includes knowledge- and probability-based inference, optimized prediction, preference-based plan, recommendation, etc.

Knowledge representation refers to technology of automating a human's experience information into knowledge data, and includes knowledge building such as data creation and classification, knowledge management such as data utilization, etc.

The methods according to the foregoing embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) or the like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing the instructions for realizing the embodiments. The instructions recorded in this storage medium may be specially designed and configured according to the embodiments, or may be publicly known and available to those skilled in the art of computer software.

The invention claimed is:

1. A display system with a plurality of display apparatuses including a first display apparatus, a second display apparatus and a third display apparatus,
the first display apparatus comprising:
a display;
a signal input/output unit configured to receive an image signal from one of the second display apparatus and the third display apparatus and transmit the received image signal to the other of the second display apparatus and the third display apparatus;
a memory configured to store an instruction; and
a processor configured to execute the instruction to:
display an image on the display based on the received image signal,
obtain normal status information predefined to show a normal operation status of the second display apparatus, wherein the second display apparatus includes a plurality of components including a first component and a second component, and the image signal is delivered from the first component to the second component,
obtain current status information showing a current status of the second display apparatus by obtaining a variation rate between a noise intensity of the first component and a noise intensity of the second component,
identify whether the second display apparatus is in an abnormal operation status by comparing the current status information with the normal status information, wherein based on identifying that the obtained variation rate exceeds a threshold of the normal status information, the processor identifies that the first component is in the abnormal operation status, and based on identifying that the second display apparatus is in the abnormal operation status, control to display a screen showing the abnormal operation status of the first component in the second display apparatus.

2. The display system according to claim 1, wherein the processor is configured to receive the normal status information from each of the second display apparatus and the third display apparatus, and store the normal status information corresponding to each of the second display apparatus and the third display apparatus.

3. The display system according to claim 1, wherein the processor is configured to transmit the normal status information to other display apparatuses among the plurality of display apparatuses through the signal input/output unit, so that the other display apparatuses can store the normal status information.

4. The display system according to claim 1, wherein the plurality of components include a signal input/output unit and a processor of the second display apparatus.

5. The display system according to claim 1, wherein
the image signal comprises a signal of content comprising a plurality of image frames, and
the processor is configured to identify that the second display apparatus is in the abnormal operation status, based on change between the plurality of image frames exceeding a second threshold.

6. The display system according to claim 1, wherein the processor is configured to output result information to be displayed on the display.

7. A method of controlling a display system with a plurality of display apparatuses including a first display apparatus, a second display apparatus and a third display apparatus, the method comprising:
displaying, by the first display apparatus, an image based on an image signal, wherein the first display apparatus is configured to receive the image signal from one of the second display apparatus and the third display apparatus and transmit the received image signal to the other of the second display apparatus and the third display apparatus;
obtaining, by the first display apparatus, normal status information predefined to show a normal operation status of the second display apparatus, wherein the second display apparatus includes a plurality of components including a first component and a second component, and the image signal is delivered from the first component to the second component;
obtaining, by the first display apparatus, current status information showing a current status of the second display apparatus by obtaining a variation rate between a noise intensity of the first component and a noise intensity of the second component;
identifying, by the first display apparatus, whether the second display apparatus is in an abnormal operation status by comparing the current status information with the normal status information, wherein based on identifying that the obtained variation rate exceeds a threshold of the normal status information, it is identified that the first component is in the abnormal operation status; and
based on identifying that the second display apparatus is in the abnormal operation status, controlling, by the first display apparatus, to display a screen showing the abnormal operation status of the first component in the second display apparatus.

8. The method according to claim 7, further comprising receiving the normal status information from each of the second display apparatus and the third display apparatus, and storing the normal status information corresponding to each of the second display apparatus and the third display apparatus.

9. The method according to claim 7, further comprising transmitting the normal status information to other display apparatuses among the plurality of display apparatuses, so that the other display apparatuses can store the normal status information.

10. The method according to claim 7, wherein the plurality of components include a signal input/output unit and a processor of the second display apparatus.

11. The method according to claim 7, wherein
the image signal comprises a signal of content comprising a plurality of image frames, and
the method comprises identifying that the second display apparatus is in the abnormal operation status, based on change between the plurality of image frames exceeding a second threshold.

* * * * *